United States Patent

[11] 3,621,097

| [72] | Inventor | John F. Scott<br>Poole, England |
|---|---|---|
| [21] | Appl. No. | 24,034 |
| [22] | Filed | Mar. 30, 1970 |
| [45] | Patented | Nov. 16, 1971 |
| [73] | Assignee | Jan Marcel Didier Aron-Samuel<br>Suresness, France |
| [32] | Priority | June 2, 1967 |
| [33] | | France |
| [31] | | 108558 |
| | | Continuation-in-part of application Ser. No. 732,832, May 29, 1968, now abandoned. This application Mar. 30, 1970, Ser. No. 024,034 |

[54] METHOD AND COMPOSITIONS FOR TREATMENT OF MENTAL ILLNESS
4 Claims, No Drawings

[52] U.S. Cl. ..................................... 424/247, 424/326
[51] Int. Cl. ..................................... A61u 27/00
[50] Field of Search ........................... 424/326, 247

[56] References Cited
UNITED STATES PATENTS

| 3,011,945 | 12/1961 | Bolling et al. | 424/247 |
|---|---|---|---|
| 3,057,780 | 10/1962 | Shapiro et al. | 424/326 |
| 3,174,901 | 3/1962 | Sterne | 424/326 |

OTHER REFERENCES

Wiezorek et al., Arch. Int. Pharmacodyn, 146, pp. 386–391, (1963).

Primary Examiner—Stanley J. Friedman
Attorneys—John M. Brown, John J. Kolano, Elliot N. Schubert, Walter C. Ramm and Helmuth A. Wegner ABSTRACT: A process for the treatment of mental illness comprising the administration of dimethyl biguanide of the formula 0001
to an animal receiving an ataractic. A pharmaceutical composition comprising dimethyl biguanide and an ataractic.

METHOD AND COMPOSITIONS FOR TREATMENT OF MENTAL ILLNESS

CROSS REFERENCE TO RELATED APPLICATION

This application is a continuation-in-part of Ser. No. 732,832, filed May 29, 1968, now abandoned.

BACKGROUND OF THE INVENTION

Dimethyl biguanide is a known hypoglycemic agent which is excreted unchanged in the urine and is without effect on the blood sugar of nondiabetic individuals. Ataractics have been previously used in the treatment of mental illness.

SUMMARY OF THE INVENTION

This invention relates to the treatment of mental illness by the administration of dimethyl biguanide, also termed N,NH-dimethylguanylguanidine, of the formula

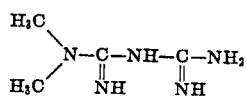

and its substantially nontoxic salts, to an animal receiving a ataractic phenothiazine or Rauwolfia derivative, to potentiate that ataractic.

This invention also relates to pharmaceutical compositions comprising dimethyl biguanide or a substantially nontoxic salt thereof and an ataractic phenothiazine or Rauwolfia derivative.

The substantially nontoxic salts of dimethyl biguanide for use in the method and compositions of this invention are those which are substantially nontoxic to the animal in therapeutic doses thereof. Suitable salts are those derived from inorganic acids, such as hydrochloric, hydrobromic, hydroiodic, sulfuric, phosphoric, nitric and sulfamic; from organic acids such as acetic, citric, lactic, maleic, malic, succinic, tartaric, cinnamic, benzoic, gluconic, ascorbic, salicylic, ethane disulfonic, fumaric, glycolic, and related acids. Dimethyl biguanide also forms quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzene sulfonate, ethyl toluene sulfonate, ethylene chlorohydrin, propylene chlorohydrin, allyl bromide, methallyl bromide and crotyl bromide.

The term "ataractic" is used here as it is understood in the art to generally refer to compounds whose effects are exerted primarily at a subcortical level so that consciousness is not interfered with, in contrast to hypnotic and sedative drugs, and includes the major tranquilizers or "neuroleptics" i.e., the phenothiazine and Rauwolfia derivatives, and the minor tranquilizers or psycholeptics. The term "ataractic phenothiazine derivative" or "ataractic Rauwolfia derivatives" refers to phenothiazine derivatives or Rauwolfia derivatives, respectively, useful as ataractic agents.

The term "phenothiazine derivative" which is used here in reference to a type of ataractic neuroleptic agent is used as it is understood in the art to generally refer to a 10- (ω-aminoalkyl) phenothiazine derivative free base or a nontoxic pharmaceutically acceptable acid addition salt thereof useful as ataractic agents.

By the term "a 10-(ω-aminoalkyl) phenothiazine derivative" used in reference to a type of ataractic agent is meant a compound of the formula

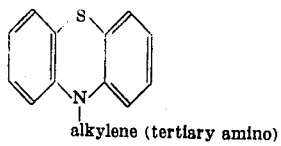

I exclusive of the presence of or absence of any substituent at the 2 and 4 positions or on the side chain. Those compounds known to be particularly valuable as ataractics are the ones in which there are three carbon atoms separating the nitrogen at the 10-position in the phenothiazine ring and the tertiary amino atom in the side chain. It is known that ataractic activity is found in this type of compound regardless of whether the 2-position is unsubstituted, or substituted by a great variety of differing substituents. Of the great number of ataractic phenothiazines, compounds of the following type have been clinically tested.

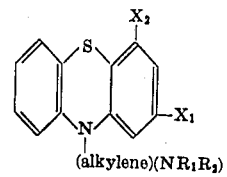

II wherein $X_1$ and $X_2$ are the same or different substituents, which are hydrogen, or a halo, trihalomethyl, lower alkyl, lower alkoxy, cyano, lower alkanoyl, lower alkylthio or lower alkylsulfinyl group, the alkylene portion is straight or branched chain and contains from one to six carbon atoms, and wherein $-NR_1R_2$ is di(lower alkyl)amino, or pyrrolidino, piperidino or piperazinyl of the formulas

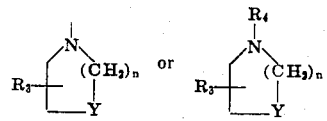

wherein $n$ is the positive integer 1 or 2, Y is methylene, and in addition when $n$ is 2, Y can also be $$-NR_5$$

$R_3$ is hydrogen, or a hydroxy or carboxamide group, $R_5$ is lower alkyl, hydroxy (lower alkyl), lower alkoxy(lower alkyl), or lower alkanoyloxy(lower alkyl).

The term "halo" refers to chloro, bromo and iodo. The term "lower" used here in reference to alkyl, alkoxy, alkanoyl, alkylthio, alkylsulfinyl, hydroxy(alkyl), alkoxy (alkyl) and alkanoyloxy(alkyl) refers to groups containing from one to four carbon atoms.

It is known that the most valuable ataractic phenothiazine derivatives are those in which the 10-nitrogen of the phenothiazine ring is separated from the nitrogen of the $-NR_1R_2$ group by a straight chain of three carbon atoms. Generally the 2trifluoromethyl and 2-cloro compounds appear to be more active than the corresponding 2-unsubstituted compounds. Numerous papers appear in the literature on structure-activity relationships.

The term "Rauwolfia derivatives" used in reference to ataractic ages refers to reserpine, reserpidine, deserpine, rescinnamine, and crude extract of Rauwolfia and powdered Rauwolfia root.

Of the 10-(ω-aminoalkyl)phenothiazine derivatives of Formulas I and II, some of those which have been used clinically are listed in table I below.

TABLE I

| Chemical Name | Generic Name |
| --- | --- |
| 22-Methoxy 10-(2-dimethylaminoethyl)-phenothiazine | Chlorphenethazin |
| 10-(2'-Dimethylaminoethyl)phenothiazine | Fenethiazine |
| 10-(1-Piperazinocarbonyl)phenothiazine | |
| 2,4-Dichloro 10-(3 dimethylamino-1'-propyl)phenothiazine | Dichlorpromazine |
| 2-Chloro-10-(3'-dimethylamino-1'-propyl)phenothiazine-5-oxide | |

| | |
|---|---|
| 2-Chloro-10-(3'-dimethylamino-1'-propyl)-phenothiazine | Chlorpromazine |
| 10-(2'-Dimethylamino-1'-propyl)-phenothiazine | Promethazine |
| 10-(3'-Dimethylamino-1'-propyl)-phenothiazine | Promazine |
| 2-Trifluoromethyl-10-(3'-dimethyl-amino-1'-propyl)phenothiazine | Triflupromazine |
| 10-(1'-Methyl-3'-pyrrolidinomethyl)-phenothiazine | Methdilazine |
| 10-(N,2'-Pyrrolidino-1'-ethyl)-phenothiazine | Pyrathiazine |
| 2-Chloro-4-methyl-10-(3'-dimethylamino-2'-propyl)phenothiazine | Methylchlorisphenergan |
| 2-Methoxy-10-(3'-dimethylamino-1'-propyl)phenothiazine | Methoxypromazine |
| 10-(3'-Dimethylamino-2'-methyl-1'-propyl)phenothiazine | Trimeprazine |
| 10-(2'-Diethylaminoethyl)phenothiazine | Diethazine |
| 2-Cyano-10-(3'-dimethylamino-2'-methyl-1'-propyl)phenothiazine | Cyamepromazine |
| 2-Acetyl-10-(3'-dimethylamino-1'-propyl)phenothiazine | Acepromazine |
| 10-(1'-Methyl-2'-piperidinylmethyl)-phenothiazine | Mepazine |
| 2-Chloro-10-(3'-diethylamino-1'-propyl)phenothiazine | Chlorproethazin |
| 10-(1''-Methyl-4''-piperazinyl-2'-ethyl)-phenothiazine | Phenazin |
| 2-Methoxy-10-(3'-dimethylamino-2'-methyl-1'-propyl)phenothiazine | Levomepromazine (1-isomer) |
| 10-(2'-Diethylamino-1'-propyl)-phenothiazine | Ethopropazine |
| 2-Methylthio-10-(3'-dimethylamino-2'-methyl-1'propyl)phenothiazine | Methiomeprazin |
| 10-(2',3'-bis-dimethylamino-1'-propyl)-phenothiazine | Aminopromazin |
| 2-Chloro-10-(1'-methyl-2',2''piperidinylethyl)phenothiazine | Piperidinochlo phenothiazin |
| 2-Chloro-10-(1'''-methyl-4'''-piperazinyl-3'-propyl-1')phenothiazine | Prochlorperazine |
| 2-Propionyl-10-(3'-dimethylamino-1'-propyl)phenothiazine | Propionylpromazine |
| 2-Propionyl-10-(2'-hydroxyethyl)-1'-propyl)phenothiazine | Propiomazine |
| 10-(1'-Methyl-4'''-piperazinyl-3'-propyl-1')phenothiazine | Perazin |
| 2-Ethyl 1-10-(3'-dimethylamino-2'-methyl-1'-propyl)phenothiazine | Ethylisobutrazine |
| 2-Cyano-10-(4'''-hydroxy-N,3'piperidinopropyl-1')phenothiazine | Propericiazine |
| 2-Chloro-10-(4'''-carboxamido-N,3'-piperidino-1'-propyl)phenothiazine | Pipamazine |
| 2-Trifluoromethyl-10-(4'''-methyl-1''',3'-piperazinyl-1'-propyl)phenothiazine | Trifluoperazine |
| 2-Chloro-10-(2''',N¹-hydroxyethyl-N²,3'-piperazinyl-1'-propyl)phenothiazine | Perphenazine |
| 2-Methylsulfinyl-10-[2'-(1-methyl-2-piperidinyl)ethyl]phenothiazine | |
| 2-Methylthio-10-[2',1-(1-methyl-2-piperidinyl)ethyl]phenothiazine | Thioridazine |
| 10-{3'-[4-(2-Hydroxyethyl)-1-piperazinyl]propyl}phenothiazine | |
| 2-Trifluoromethyl-10-{3'-[4-(2-hydroxyethyl)-1-piperazinyl] propyl}phenothiazine | Fluphenazine |
| 2-Ethylthio-10-[3'-(4-methyl-1-piperazinyl)propyl]phenothiazine | Thiethylperazine |
| 2-(N,N-Dimethylsulfamoyl)-10-[3'-(4-methyl-1-piperazinyl)propyl]phenothiazine | Thioperazine |
| 1-(2-Hydroxyethyl)-4-[10-(2-trifluoromethylthiazinyl)-3-propyl]-homopiperazine | |
| 2-Chloro-10-{3'-[4-(2-acetoxyethyl)-1-piperazinyl]propyl}phenothiazine | Thiopropazote |
| 2-Acetyl-10-{3'-[4-(2-hydroxyethyl)-1-piperazinyl]propyl}phenothiazine | Acetophenazine |
| 2-Acetyl-10-{3'-[4-(2-hydroxyethyl)piperidino]propyl}phenothiazine | Piperacetazine |
| 2-Butyryl-10-[3'-(4-methyl-1-piperazinyl)propyl]phenothiazine | Butyrylperazine |
| 2-Propionyl-10-{3'-[4-(2-hydroxyethyl)-1-piperazinyl]propyl}phenothiazine | Carphenazine |
| 2-Propyl-10- 3'-[4-(2-hydroxyethyl)-1-piperazinyl]propyl}phenothiazine | Proketazin |
| 10- 2'-Methyl-3'-[4-(2-hydroxyethoxyethyl)-1-piperazinyl]propyl}phenothiazine | Dixyrazine |
| 2-Chloro-10{3'-[4-(3,4,5-trimethoxybenzoyloxyethyl)-1-piperazinyl]propyl}phenothiazine | Methophenazin |

The dimethyl biguanide of this invention is particularly useful with alerting or moderately alerting phenothiazine tranquilizers such as 2-chloro-10-[3-(1-methyl-4-piperazinyl)-1-propyl]phenothiazine (prochlorperazine) and 2-trifluoromethyl-10-[3-(1-methyl-4-piperazinyl)-1-propyl]phenothiazine (trifluoperazine).

Dimethyl biguanide is prepared according to the general procedures set forth in J. Am. Chem. Soc., 81 3728 (1959) and U. S. Pat. No. 3,174,901.

In accordance with this invention, it has been found that dimethyl biguanide has the ability to potentiate the effects of ataractics, especially the neuroleptic phenothiazine and Rauwolfia derivatives. This property is surprising in view of the fact that the compound administered alone at equivalent doses is without ataractics effect. This ability to potentiate the effects of ataractics is of particular usefulness for conditions in which elevated dosages of the ataractics are normally used.

The biguanide alone or a combination of the biguanide administration by combination with a pharmaceutical carrier. Solid carriers can include disintegrators, lubricants, diluents, binders, flavors and other substances used in solid dosage unit forms. Liquid carriers can include water, edible oils, alcohol, glycols, suspending agents, surfactants, preservatives and other substances employed in liquid dosage unit forms. Specific examples of the substances which can be included in the carriers are sugar such as lactose and sucrose; starches such as corn starch and potato starch; cellulose derivatives such as sodium carboxy-methylcellulose, ethylcellulose, methylcellulose, cellulose acetophthalate; gelatin; talc, stearic acid; alkaline earth metal stearates such as magnesium stearate, vegetable oils such as peanut oil, cotton seed oil, sesame oil, olive oil, corn oil and oil of theobroma; propylene glycol; glycerine; sobitol, polyethylene glycol; water; agar; alginic acid; isotonic saline; and phosphate buffer solutions, as well as other nontoxic, compatible substances used in pharmaceutical formulations. The compounds can be prepared for oral administration in the form of simple or sustained-release tablets, lozenges, capsules (either liquid or dry filled), dragees, pills, powders and aqueous and nonaqueous solutions or suspensions; for rectal administration in suppositories; and for parenteral administration in aqueous or nonaqueous solutions or suspensions.

It has been found that the dosages of biguanide to be used in potentiating the effects of ataractics are the same as those used for the compound as a hypoglycemic agent. Thus the term "potentiating effective" dose of the biguanide used here refers to the dosage used in mental illness and is equivalent in amount to dosages of the compound used in treating diabetic hosts. Although the daily dosage of the biguanide to be administered thus will be dependent on the type and weight of animal to which it is administered and the condition being treated, certain generalizations can be made. For treating adult humans by the oral or rectal route the daily dosage of dimethyl biguanide in the form of hydrochloride salt is desirably about 5 to 50 mg./kg. body weight, e.g. at least 0.5 gram and preferably 1 to 4 or 5 grams daily. A typical regiment would be the initial administration of 1 gram daily in divided doses which is increased gradually to 4 or even 5 grams depending on the tolerance of the patient. The dosage for children and nonhuman animals varies directly proportionately thereto in accordance with the weight of the subject to be treated.

The amount of ataractic to be administered is a "standard" dose, i.e. that dose standard for the type of subject and the condition to be treated and its severity. Thus, the ataractic trifluoperazine is suitably administered at a dose of about 0.1 to 1.5 mg./kg. body weight, e.g. at the dose of roughly 2 to 20 milligrams, three times a day orally. Adult human (eg. 45 to 100 kg. body weight) dosages of other neuroleptic ataractics are listed in the table below.

TABLE II

ATARACTICS

| Generic Name | Human Daily Oral Adult Dosage Range (in milligrams) |
|---|---|

| Phenothiazine Dialkyl Amino Derivatives | |
|---|---|
| Chlorpromazine | 25–1000 |
| Methoxypromazine | 30–1500 |
| Promazine | 40–1000 |
| Promethazine | 50–300 |
| Propiomazine | 10–30 |
| Triflupromazine | 20–150 |
| Trimeprazine | 5–80 |
| Piperazine Phenothiazine Derivatives | |
| Acetophenazine | 40–80 |
| Fluphenazine | 1–300 |
| Perphenazine | 12–100 |
| Prochlorperazine | 15–250 |
| Thioperazine | 5–50 |
| Thiopropazate | 8–30 |
| Piperadine Phenothiazine Derivatives | |
| Mepazine | 75–800 |
| Thioridazine | 20–800 |
| Rauwolfia Alkaloids | |
| Reserpidine | 15–60 |
| Alseroxylon | 2–4 |
| Deserpidine | 0.1–3 |
| Rescinnamine | 0.5–1 |
| Reserpine | 0.1–15 |

The compositions of this invention comprise dimethyl biguanide or a substantially nontoxic salt thereof, the neuroleptic phenothiazine or Rauwolfia derivative and a pharmaceutical carrier. As previously specified, the pharmaceutical carrier may be either a solid or liquid of the types mentioned. The amount of solid carrier used is not critical and will vary from preparation to preparation. The amount of solid carrier used in a preparation for oral administration will preferably be from about 25 milligrams to about 1 gram, the exact upper limit being selected for convenience of administration and of pharmaceutical form preparation.

The amount of active ingredients in a given unit of the pharmaceutical form is an "effective" dose of the biguanide/n and an effective dose of the ataractic/n, n being defined as the number of units to be administered daily and conveniently varying in magnitude from one to 10. Thus the weight ratio of amount of biguanide to neuroleptic will be about 1:0.000025 to 1:025 by weight of the active ingredients, depending on the ataractic chosen. As an additional example, where a dosage unit of the composition is to be administered four times daily, n=4 and the composition for adult human would contain about 1 gram biguanide and one-fourth the effective dosage of the neuroleptic. Wide variations can be made in the actual amount of biguanide and neuroleptic present in the dosage unit depending on the total amounts of each to be administered daily. A particularly convenient composition for use is one containing about 500 milligrams of the biguanide and one-eighth the standard dosage of the ataractic. Alternatively, the biguanide and ataractic can be administered in separate pharmaceutical forms.

Since the action of the dimethyl biguanide is to potentiate the effects of the ataractic, it is used in treating those mental illnesses in which ataractics are administered. This combination of drugs is particularly useful in treating severely disturbed individuals showing symptoms of withdrawal, apathy, dullness, uncommunicative behavior, perplexity and confusion, delusions and hallucinations such as schizophrenia of the hebephrenic and catatonic types and the schizoid effect in autistic children. Likewise the combination may be used in treating obsessional neurosis, the dementia of psycotic state and senile arteriosclerotic depression.

The following examples further illustrate the invention and should not be construed as limiting the scope thereof. References to quantities of materials in parts refers to parts by weight.

EXAMPLE 1

Fifty parts of dimethyl biguanide, 8.5 parts of sodium bicarbonate and 1.5 parts of magnesium stearate are mixed and filled into hard gelatin capsules of a size sufficient that each capsule contains 0.5 gram of dimethyl biguanide.

Alternatively, 0.2 part of trifluoperazine can be added to the mixture afford capsules each containing 500 milligrams of dimethyl biguanide and 2 milligrams of trifluoperazine.

EXAMPLE 2

Five hundred parts of dimethyl biguanide hydrochloride, 100 parts of sucrose, 800 parts of mannitol and 40 parts of polyvinylpyrrolidone are mixed, screened, and granulated with ethanol. The granulation is then screened, dried, and screened again. To the granulation there is then added 40 parts of hydrogenated cotton seed oil and the entire granulation mixed thoroughly, assayed and then compressed into tablets each containing 500 milligrams of dimethyl biguanide hydrochloride.

Alternatively, two parts of trifluoperazine can be added to the mixture, thus affording tablets containing 500 milligrams of dimethyl biguanide hydrochloride and 2 milligrams of trifluoperazine. The resulting tablets can be used for oral administration to adult, about three to eight or even 10 times daily. Similarly, substitution of one of the following compounds in the indicated amount for the two parts of trifluoperazine in this procedure affords suitable composition tablets:

chlorpromazine, about 30–100 parts;
methoxypromazine, about 30–150 parts;
promazine, about 40–100 parts
promethazine, about 10–15 parts;
propiomazine, about 1–3 parts;
triflupromazine, about 2–15 parts;
trimepazine, about 5–8 parts;
acetophenazine, about 4–8 parts;
fluphenazine, about 0.1–2 parts;
perphenazine, about 6–7 parts;
prochlorperzine, about 2–15 parts;
thiopropazate, about 0.8–3 parts;
mepazine, about 8–80 parts;
thioridazine, about 2–80 parts;
alseroxylon, about 0.2–0.4 part;
deserpidine, about 0.01–0.3 part;
rescinnamine, about 0.05–0.1 part;

EXAMPLE 3

A sterile aqueous solution for intramuscular use, containing 250 milligrams of dimethyl biguanide per milliliter is prepared from the following types and amounts of ingredients:

| Dimethyl biguanide hydrochloride | 250 grams |
|---|---|
| Methyl p-hydroxybenzoate | 2.5 grams |
| Propyl p-hydroxybenzoate | 0.17 grams |
| Water for injection, q.s. | 1000 milliliters |

The ingredients are dissolved in the water and the solution is sterilized by filtration. The sterile solution is filled into vials and the vials sealed.

EXAMPLE 4

Four hundred and twenty-five parts of pulverized dimethyl biguanide hydrochloride is granulated with 19 parts of polyvinylacetate in about 30 parts of ethanol. The granulate was then passed through a 1.141 millimeter mesh screen and then dried for about 12 hours at 45° C. The dry mass is then passed through a 0.84 millimeter mesh screen. To the mass obtained there is added 2.5 parts of magnesium stearate, then the resulting mixture is stirred and then 2.5 parts of Vaseline oil is added. The mass is then compressed into tablets each weighing about 900 milligrams. The tablets are then coated by introducing them into a coating turbine containing a mixture of 8.1 parts of ethyl acetate, 8.1 parts of 2-propanol, 1.4 parts of cellulose acetophthlate and 0.36 parts of ethyl phthalate.

EXAMPLE 5

Adult rats were divided into lots of six rats each. One lot is administered a dose of phenothiazine neuroleptic alone; the other lot is given a selected, buccal dose of dimethyl biguanide hydrochloride, and thereafter administered an identical dose of the same phenothiazone, 30 minutes after the biguanide administration if the neuroleptic is administered by the buccal route or 1 hour after the biguanide administration if the neuroleptic is to be administered by the intraperitoneal route. The doses of the phenothiazine neuroleptic administered are high enough to induce catatonia. The animals were placed in cages and were observed at various times over a 5-hour period. At each of the observation times each rat was placed on a table and its foot was raised onto a plug. If, at the end of 10 seconds, the rat had not withdrawn its foot, it was designated as catatonic. The test compound neuroleptic tranquilizers used were thioperazine, prochlorperazine and trifluoperazine.

In accordance with the above procedure two of six rats receiving 20 milligrams per kilogram thioperazine by the buccal route exhibited catatonia at the times of observation over the 5-hour observation period. In the group that received 400 milligrams per kilogram of dimethyl biguanide hydrochloride in addition to the buccal administration of 20 milligrams per kilogram thioperazine, catatonia was observed in five of the six at the end of the first hour following treatment; thereafter the number of animals showing catatonia diminished successively until only one of the six showed catatonia after 3½ hours.

The catatonia induced by the intraperitoneal administration of 8 milligrams per kilogram of prochlorperazine was increased in intensity and duration by the buccal administration of 400 milligrams per kilogram of dimethyl biguanide hydrochloride. Thus at 1½ and 2½ hours after treatment two of the six animals given prochlorperazine alone showed catatonia, while five of the six animals given both prochlorperazine and dimethyl biguanide hydrochloride showed catatonia, while the numbers showing catatonia 4 to 5 hours after treatment were one or two of the six and three or four of the other six, respectively. Likewise, the catatonia induced by the intraperitoneal administration of 10 milligrams per kilogram of prochlorperazine was increased in intensity and duration by the buccal administration of 200 and 400 milligrams per kilogram of dimethyl biguanide hydrochloride, respectively.

The catatonia produced by the intraperitoneal administration of 5 milligrams of trifluoperazine was increased in duration and intensity by the administration of 100, 200 or 400 milligrams per kilogram of dimethyl biguanide hydrochloride buccally.

EXAMPLE 6

Four hebephrenic schizophrenics who at a previous hospitalization had received 5 milligrams of trifluoperazine plus 50 milligrams orphenadrine hydrochloride, three times a 5 milligrams of trigluoperazine plus in addition to having eight to 12 electroshock treatments each were rehospitalized. Upon readmission, the patients were given the same dosages of trifluoperazine and orphenadrine hydrochloride for a period of 2 weeks, then they were given in addition 0.5 gram of dimethyl biguanide hydrochloride twice daily and the dosage increased over 10 days to 1 gram four times a day. The improvement after initiation of the administration of dimethyl biguanide hydrochloride was sufficient enough to permit all four patients to return to their homes and previous occupations.

EXAMPLE 7

Twenty-seven refractory male chronic schizophrenic patients, ranging in age from 28 to 64 years with an average of 44 years and having a duration of illness ranging from 2 to 40 years with an average of 16 years were selected for study. Most of the patients had shown no material change clinically for some years and six were grossly deteriorated.

All of the subjects were given 5 milligrams of trifluoperazine and 50 milligrams of orphenadrine hydrochloride three times each day for a period of 4 weeks. At the end of this period the patients in addition each received an additional dosage of 500 milligrams of dimethyl biguanide hydrochloride three times daily which was increased over a period of 7 days until a final dosage of 1 gram four times per day was attained. After 6 weeks 14 of the subjects were given a placebo for 4 weeks while the remaining 13 continued to receive the dimethyl biguanide hydrochloride. Each patient was independently assessed by two clinicians using an appropriate rating scale for chronic schizophrenia described by Wing. J. Ment. Sci. 107 862 (1961).

Twenty-two of the patients showed evidence of improvement during the first 6 weeks of dimethyl biguanide hydrochloride administration. Of the 14 patients then given a placebo for 4 weeks, seven deteriorated significantly; and the remaining seven were unchanged, but four of them had shown no improvement in the first 6 weeks anyway. Of the 13 patients continuing to receive the dimethyl biguanide hydrochloride during the 4-week period, 11 continued unchanged, one improved and one deteriorated.

What Is claimed is:

1. The method of treatment of mental illness which comprises the administration of a potentiating effective dose of a compound selected from the group consisting of dimethyl biguanide and its substantially nontoxic salts to an animal being treated with a standard dose of a ataractic neuroleptic phenothiazine or Rauwolfia derivative.

2. The method of claim 1, in which the animal is a human and the amount of biguanide administered is at least about 0.5 to 4 grams per day.

3. The method of claim 2, in which the biguanide is dimethyl biguanide hydrochloride.

4. The method of claim 2 in which the tranquilizer is selected from the group consisting of trifluoperazine, thioperazine and prochlorperazine.

* * * * *